(12) United States Patent
Rees

(10) Patent No.: US 6,529,210 B1
(45) Date of Patent: Mar. 4, 2003

(54) INDIRECT OBJECT MANIPULATION IN A SIMULATION

(75) Inventor: David B. T. Rees, Palo Alto, CA (US)

(73) Assignee: Altor Systems, Inc., Palo Alto, CA (US)

( * ) Notice: Subject to any disclaimer, the term of this patent is extended or adjusted under 35 U.S.C. 154(b) by 0 days.

(21) Appl. No.: 09/274,567

(22) Filed: Mar. 23, 1999

Related U.S. Application Data

(60) Provisional application No. 60/081,040, filed on Apr. 8, 1998.

(51) Int. Cl.[7] ............................................... G06T 11/00
(52) U.S. Cl. ...................................................... 345/654
(58) Field of Search .................................. 345/419, 850, 345/851, 852, 642, 757, 751, 654; 703/6, 7

(56) References Cited

U.S. PATENT DOCUMENTS

| | | | |
|---|---|---|---|
| 4,720,703 A | | 1/1988 | Schnarel, Jr. |
| 4,734,690 A | | 3/1988 | Waller |
| 4,808,979 A | | 2/1989 | DeHoff et al. |
| 4,857,902 A | | 8/1989 | Naimark et al. |
| 5,276,785 A | | 1/1994 | Mackinlay et al. |
| 5,359,703 A | | 10/1994 | Robertson et al. |
| 5,471,571 A | * | 11/1995 | Smith et al. ................ 345/676 |
| 5,588,098 A | | 12/1996 | Chen et al. |
| 5,604,848 A | * | 2/1997 | Harada et al. .............. 345/419 |
| 5,764,818 A | | 6/1998 | Capps et al. |
| 6,271,842 B1 | * | 8/2000 | Bardon et al. .............. 345/355 |

OTHER PUBLICATIONS

Bowman et al. An Evaluation of Techniques for Grabbing and Manipulating Remote Objects in Immersive Virtual Environments. Symposium on Interactive 3D Graphics. 1997. Association for Computing Machinery. pp. 35–38.*
Abrash, Quake: A Post–Mortem and a Glimpse into the Future, Computer Games Developer's Conference, 1997.
Bukowski, A Simple and Practical Approach to Virtual 3D Manipulation, 1995 Symposium on Interactive 3D Graphics.
Jeng, Moving Cursor Plane for Interactive Sculpting, 1996, ACM Transactions on Graphics, vol. 15, No. 3, 07/96.
Foley, Computer Graphics, Principles and Practice.
Glassner, Graphics Gems, Academic Press, Inc., Xerox Palo Alto Research Center.
Hartman, The VRML 2.0 Handbook, Building Moving Worlds on the Web, 1996, Silicon Graphics, Inc.
Physics, The Next FRontier, Game Developer, Oct. 1996, 12–20p.
Hecker, Physics, Part 2: Angular Effects, Game Developer, Dec. 1996, p 14–22.
Hecker, Physics, Part 3: Collission Response, Game Developer, 3/1997, p 11–18.
Win32 Game Developer's Guide with Directx 3, Direct3d Basics, p 275–279.

(List continued on next page.)

Primary Examiner—Almis R. Jankus

(57) ABSTRACT

A method and apparatus for user interaction with animated objects displayed in a repeatedly updated 3-D computer simulated environment using 2-D cursor and button input. The invention provides for user manipulation of 3-D objects in a simulation where conflicting goals may be simultaneously applied to the objects and resolved. All goals acting on an object are translated to equivalent information in terms of physical forces, and are applied as forces via a physically based model, where this model has no knowledge as to the source of each force. Each user is treated as an entity in the environment, with a positional presence. The positional presence of a user is represented by a user object displayed in the simulation. The invention provides a unique interface to a real-time simulation that is easy to use, by virtue of mapping a subset of the inputs to actions consistent with the expectation of the user actually being physically present within the environment. Moreover, the invention can be implemented on a wide range of low cost computing systems, as the requirements are for a minimum of 2-D input and output.

23 Claims, 9 Drawing Sheets

OTHER PUBLICATIONS

Mackey, Exploring New Worlds with Quicktime VR, IMergy, p. 257–267.

Tricks of the Mac Game Programming Gurus, Chapter 7, Game Mechanics: Environments and Entities.

Stein III, Computer Game Developers Conference 96, The Making of 11th Hour, p 435–438.

Stiles, Adapting VRML 2.0 for Immersive Use, Lockheed Martin Advanced Technology Center., p 75–81.

* cited by examiner

INDIRECT OBJECT MANIPULATION IN A SIMULATION

This application claims the benefit of U.S. Provisional Application Ser. No. 60/081,040 filed Apr. 8, 1998.

TECHNICAL FIELD

The present invention relates generally to the field of manipulation of 3-D objects on computer displays. More particularly, the present invention relates to techniques for simulating life-like user interaction with 3-D objects displayed in computer simulated environments. In accordance with the invention, the 3-D objects are subjected to conflicting goals including the goal of desired object movement by the user such that a resolution of these conflicting goals during user manipulation and resultant movement of the 3-D object creates the impression that the 3-D object is influenced by conflicting physical forces, such as gravity, object initiated motion, etc.

BACKGROUND OF THE INVENTION

The techniques used in our invention stem from several different backgrounds. Within the domain of 3-D CAD/CAM (Computer Aided Design, Computer Aided Manufacture), a 3-D workspace containing data representations is presented to the user, with the objective of fashioning more 3-D data in accordance with a set of user commands. One manner of interaction in this medium is via a 2-D cursor, where a variety of operations may be performed upon 3-D data. The 3-D position associated with the cursor is derived in a variety of manners, including: use of a secondary form of input; associating the cursor with some additional piece of geometry in the 3-D workspace; interpreting cursor motion as gestures; and augmenting the cursor with additional visual representations inferring additional positioning control. These commands are carried out in a static environment - one where the user selected data and that to which it holds a direct relationship is altered. While the user is interacting with a subset of the data in these environments, other data is not continuously updated in position or orientation unless as a consequence of user interaction. The commands are also carried out as a direct response to the positioning of the cursor. For example, if the cursor is used to select data and then the cursor is moved to a different location, the position of the data is set via a direct mapping from the 2D cursor coordinate to the 3-D data coordinates.

U.S. Pat. No. 5,359,703 describes a technique for operating a system to produce the perception of control of an object in a 3-D workspace presented on a computer display. A mouse or keyboard is used to input movement changes which are directly applied to the 3-D object via a logarithmic function and/or an acceleration function.

Some CAD research has highlighted the use of constraint based systems, whereby 2-D input may be mapped in a manner to 3-D allowing much easier completion of tasks by the user. Explicit relationships are formulated between objects being manipulated and other elements of their environment.

For example, Bukowski, Richard W. and Soquin, Carlo H., "Object Associations: A Simple and Practical Approach to Virtual 3D Manipulation", University of California at Berkeley, 1995 *Symposium on Interactive 3D Graphics,* Monterey Calif. USA, 1995, describes a process by which an object may be moved above a table and wherein a constraint is inferred attaching the object to the table by some form of pseudo gravity. In the same manner, objects may be attached to other objects or to walls. The viewpoint may be moved while focused upon a specified point upon an object, to enable easy close-up and distant views of the point. Objects may also be moved by applying force, in the same manner as moving them using a rubber band. A similar technique for producing the perception of a moving viewpoint within a 3-D space on a computer display is disclosed in U.S. Pat. No. 5,276,785.

It should be noted that all these advanced proposals still hold the same goal in mind, that to goal being to facilitate the construction and manipulation of objects in a 3D environment by a user, where the user's goals are to be attained in the easiest possible manner, with minimal interference from other data and entities present (e.g., other users). The prior art techniques described above are inadequate to represent conflicts between entities concerning the manipulation of objects, or to represent entities aiding each other in picking up and moving objects. Moreover, the techniques disclosed in the prior art noted above do not provide a physical sense of actually holding an object, with feedback as to whether the object is heavy or light, or has other such physical properties.

Additional interpretations of 2-D input to create a 3-D position by the use of additional on-screen information are known from the prior art. For example, U.S. Pat. No. 4,808,979 discloses one such method involving symbols to tether a cursor and an object. As another example, U.S. Pat. No. 5,588,098 discloses a method for manipulating an object by use of a displayed bounding region.

These and many other techniques, such as those described in Foley, James and van Dam, Andies, and Feiner, Steven, and Hughes, John, "Computer Graphics: Principles and Practice, Second Edition", Addison Wesley Publishing Company Inc., 1990, all provide improved object manipulation in a 3-D workspace using 2-D input devices. However, these methods are unsuitable for an entertainment product, where the user's imagination is immersed in the environment. In most of these contexts, such symbols would not be considered a natural part of the environment, breaking the illusion of immersion.

In contrast with the above-described 3-D CAD/CAM domain of interaction, there is real-time 3-D first person perspective entertainment software (referred to as 'first-person') that involves the interaction of a user represented as a collection of data within a 3-D environment. Examples of such 'first person' entertainment software include the products detailed in Abrash, Michael, "Quake: a Post-Mortem and a Glimpse into the Future", *Id Software, Computer Game Developers Conference Proceedings,* 1997, and the implementation described in Kolb, Jason, "Win32 Game Developer's Guide with DirectX 3", The Waite Group, 1997.

In the known 3-D first person entertainment software games, the state of the 3-D environment is being continuously updated at a rate which provides the illusion of a real life occurrence happening at a realistic rate, hence the term "real-time". It is viewed from a first person perspective, as if the viewpoint represents eyes which are a component of the user's simulated body. The simulation takes place independently to some degree of user interaction. Data representing objects and states in the 3-D space may react to user actions. However, through computer code instructions, objects may also follow a set of objectives in which the user has no part, or which the user must oppose. Codified rules exist as to what should occur when user data and other data interacts, for example, due to proximity. These rules generally involve the collision and repulsion of data, or setting of a given state in either data set via a direct, or physical model. For example, a switch may be thrown.

Input from a mouse, trackball, or keyboard is applied to specify a change in orientation and position of the user viewpoint. In many first-person games, when some form of selection or manipulation input is generated, changes are made to the environment on the basis of what is closest to the center of the entire viewing area at or around that instant in time. Within or about this region, a piece of data is selected by an algorithm, such as proximity to the line of the user viewpoint orientation. The resulting state change is normally bounded by a small series of discrete state changes, often a simple activated/deactivated change.

Such interaction is well suited to conflict in large environments, wherein the objects to be manipulated are widely separated, so as not to be confused if many are present in the user's view. However, such interaction is poorly suited to the manipulation of detailed spaces containing closely positioned devices or objects which can be controlled. Hence, this type of environment is avoided in the design of such games.

First-person entertainment software has to date avoided the style of interaction present in CAD/CAM applications, and hence the scope and detailed control of such applications. In addition, interaction is normally limited, in that one grasped item is exclusively manipulated by one entity in the environment at any one instant of time.

Virtual Reality (VR) environments normally involve a 3-D environment, whose state is being continuously updated independently, to some degree, of user interaction. Greater interaction is possible in the environment, such as selection of specific data objects while other environmental states are changing. Selection and manipulation may take place using a 'data glove' or other devices providing three or more dimensions of input. Such devices are not widely deployed amongst personal computers (PCs), and are more expensive than the keyboard and mouse usually provided with PCs.

It is also possible to use a 2-D positioned device to select and move objects. Entertainment based VR software systems normally employ limited selection capabilities often akin to first-person software. Some VR software interaction takes a form similar to that of 3-D CAD/CAM, the difference being that other activities may be simultaneously occurring in the space. However, this more detailed interaction is usually applied toward CAD or demonstrational goals. In the case of 2-D interaction, the selected objects are moved by mapping the 2-D position onto the 3-D position of the object in some manner involving exclusive ownership by one user. Examples of such interaction may be found in: Stiles, Randy, "Adapting VRML 2.0 for Immersive Use", *Lockheed Martin Advanced Technology Center,* VRML 97 *Second Symposium on the Virtual Reality Modeling Language,* Monterey Calif. USA, 1997; and Harman, Jed and Wernecke, Josie, "The VRML 2.0 Handbook: Building Moving Worlds on the Web", Silicon Graphics Inc., Addison Wesley Publishing Company Inc., 1996.

As with CAD/CAM, such methods would be inadequate to represent conflicts between plural entities concerning the manipulation of an object simultaneously held by these entities. Moreover, they do not provide a physical sense of actually holding an object, with feedback as to whether the object is heavy or light, or has other such physical properties.

A further category which predates my work is the entertainment software category of 2-D puzzle solving and adventuring. In the 2-D puzzle solving and adventuring entertainment software medium, the simulated environment is presented as a discrete set of images of a 3-D environment, each from a specific position. An example is disclosed in U.S. Pat. No. 4,857,902 which teaches to use video disk data to supply the set images of the 3-D environment. The techniques used in the 2-D puzzle solving and adventuring category of entertainment software are distinct from the above cases in that the majority of the depiction is precalculated before the software is executed. Within this environment, users may move position in discrete steps. The user may look around and zoom in to closely examine a part of the view from this position, using techniques such as those disclosed in U.S. Pat. No. 4,734,690. The user may also pan a viewport window with respect to a virtual screen stored in memory in accordance with the cursor motion techniques disclosed in U.S. Pat. No. 4,720,703. Users may select objects by use of a 2-D cursor. The objects may then be moved in a 2-D, or sometimes a 3-D constrained fashion. Descriptions of this type of environment are given in Mackay, Peter, "Exploring new worlds with Quick Time<< VR", *Media Integration, Computer Game Developers Conference Proceedings,* 1996, and Stein III, Robert, "The making of 11th Hour", *Computer Game Developers Conference Proceedings,* 1996.

However, in the 2-D puzzle solving and adventuring entertainment software medium, objects do not interact by collision or other physical modeling constraints with a variety of other objects in the environment. Instead, object interactions are normally described in terms of specific unique interactions with other objects, illustrated by pre-drawn artwork. This allows for a wide variety of interactions, with the constraint that the interactions that can occur are those explicitly codified and/or drawn during the construction of the product. Interactions based on physical or other general laws are not present. Objects selectable by the user cannot simultaneously and independently be selected and manipulated by other entities in the environment. This is a factor in a frequent criticism of this genre, stating that such games can be very frustrating. A commonly cited reason for this is that objects can only be applied in the manner intended by the designer, not necessarily in the manner desired by the user.

Real time 3-D third person perspective (referred to as 'third-person') entertainment software is distinguished from first-person entertainment software by the viewpoint being loosely associated with and located some distance from the object which represents the user in the space.

In most such third person games, manipulation of the user is quite complex, as a variety of actions are required to complete the tasks specified in the game. However, each action normally requires an input which bears little physical relation to the action performed. Usually a variety of unique button presses or combinations of buttons pressed are required for each such action. This makes the game difficult to master since it requires extensive knowledge of the combinations involved.

Manipulation of objects other than the user is possible in such environments, but is usually fairly simple in nature. Typically, the object representing the presence of the user within the computer simulated environment, referred to as the user object, is first aimed at or in the proximity of the object to be manipulated, followed by one or more button presses or distinct combinations of buttons pressed. As with first-person games, the resulting state change is normally a small series of discrete state changes, often a simple activated/deactivated change. Objects may also be pushed, by moving the user object against the target object and possibly engaging some buttons, in order to move the object in the direction in which the user is moving. Again, as with first-person games, such interaction is well suited to large environments in which objects to be manipulated are widely separated. However, it is poorly suited to fine control, or to easily differentiating between closely spaced objects. For example, it would be difficult or impossible to move only one small object closely ringed by other small objects. As with other entertainment genres, interaction is normally limited, in that one grasped item is exclusively manipulated by one entity in the environment at any one instant of time.

Some third-person games use 2-D cursor input to set the state of data in the environment, but in a direct manner where the effect of a button click is as rapidly as possible translated into a change in a component of the data to which the cursor is pointed. This 2-D input is not a change being made by physically associating the user object with the change or by moving the selected object as if picked up by the user object. Rather, the change is being made by the user acting as some agent external to the user object. This is not applied to the action of objects being grasped by an entity in the environment, nor to multiple entities simultaneously grasping and vying for control of an object.

SUMMARY OF THE INVENTION

Accordingly, a general objective of the present invention is to provide techniques for producing the perception of actual manipulation of an object on a display with feedback to indicate whether the object is heavy or light, or possesses other such physical properties.

It is another objective of the present invention to provide techniques for representing and resolving conflicts between two or more entities (users) concerning the manipulation of an object simultaneously held by these entities.

The foregoing and other objectives are provided by a method for user interaction with animated objects displayed in a repeatedly updated 3-D computer simulated environment using 2-D cursor and button input. The present invention allows user manipulation of 3-D objects in a simulation where conflicting goals may be simultaneously applied to the objects and resolved. All goals acting on an object are translated to equivalent information in terms of physical forces, and are applied as forces via a physically based model, where this model has no knowledge as to the source of each force.

Each user is treated as an entity in the environment, with a positional presence. The positional presence of a user is represented by a user object displayed in the simulation. In a preferred embodiment, the user object may take the form of an animated virtual hand. While manipulation on an object is taking place, or at other times, other entities within the simulation may also manipulate the same or other object in the simulation. In other words, more than one entity may manipulate the same data simultaneously. Other forces and entities may be acting upon the representation of the user in the simulation, and elements the user seeks to control. The invention provides a unique interface to a real-time simulation that is easy to use, by virtue of mapping a subset of the inputs to actions consistent with the expectation of the user actually being physically present within the environment. Moreover, the invention can be implemented on a wide range of low cost computing systems, as the requirements are for a minimum of 2-D input and output. The virtual hand can grab, lift, drag, or click on objects within the environment, and be used to allow the user object to climb or otherwise move, in a novel fashion. Thus, other objects representing other users or computer simulated entities can simultaneously and independently manipulate and affect those same or other objects. If an object is not manipulated, the cursor may be used to specify a direction in which the user object should rotate or alter it's special position, allowing other means of travel through the environment.

In accordance with an advantageous feature of the present invention, other entities within the environment may simultaneously apply forces to an object that is the subject of object selection and drag operations by a particular user. Due to this feature, the other entities may intervene to partially aid or thwart a particular user's intended goals. Hence, physical conflict for ownership of objects or physical help in performing tasks may be portrayed in a new manner.

Upon selecting an object under defined circumstances, the user may move their own position, as if by pulling or pushing themselves with respect to the selected object, by moving the cursor. This allows the expression of a variety of tasks, such as climbing, in a manner which is easy to use. In addition, control via cursor and weighted force allows a fine degree of control of the user's position, compared with the button input previously associated with related actions.

Visual feedback as to the weight of a selected object is provided by the degree to which it keeps up with the cursor position, providing this information in an intuitive manner, compared with non-physically based manipulation of a selected object. Given that a selected object has momentum, is light enough, and if it is dragged rapidly and released during this action, the object may also be "thrown" into the environment.

Methods and apparatus which incorporate the features described above and which are effective to function as described above constitute specific objectives of this invention.

Other and further objectives of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DETAILED DESCRIPTION OF THE PREFERRED EMBODIMENTS

Figure 1:
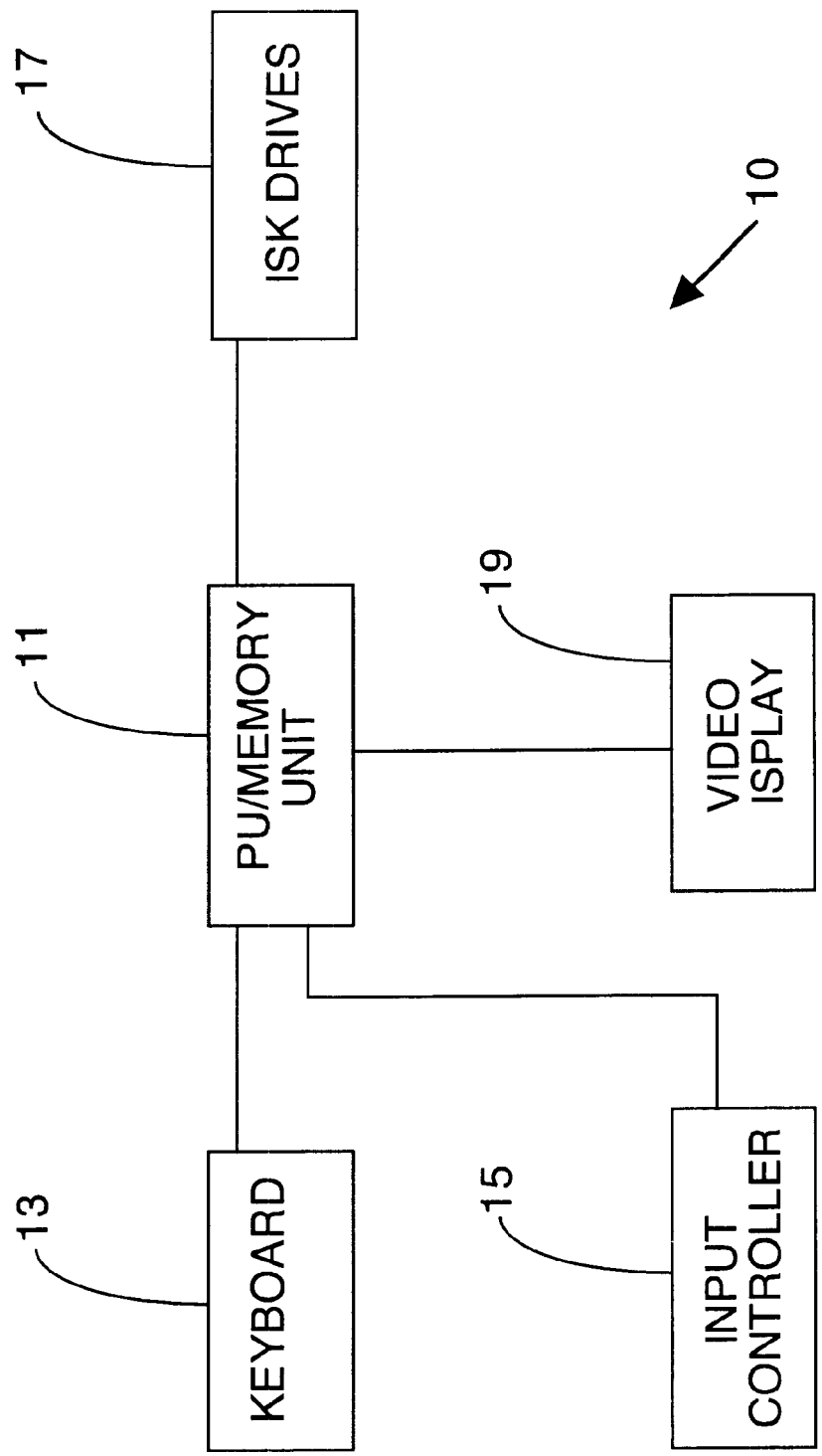
FIG. 1 depicts a generalized block diagram of a computer system as might be used by the present invention.

The present invention generally involves the indirect manipulation of objects in a three dimensional simulation represented on a computer display. It is helpful to provide a brief discussion of the pertinent computer environment. FIG. 1 is a generalized block diagram of an appropriate computer system 10 which includes a CPU/memory unit 11 that generally comprises a microprocessor, related logic circuitry, and memory circuits. A keyboard 13 provides inputs to the CPU/memory unit 11, as does two-dimensional input controller 15, which by way of example can be a mouse, a 2-D trackball, a joystick, a stylus, a touch screen, a touch tablet, etc., with a mouse being preferred. Disk drives 17, which can include fixed disk drives, are used for mass storage of programs and data. Display output is provided by video display 19.

Figure 2:
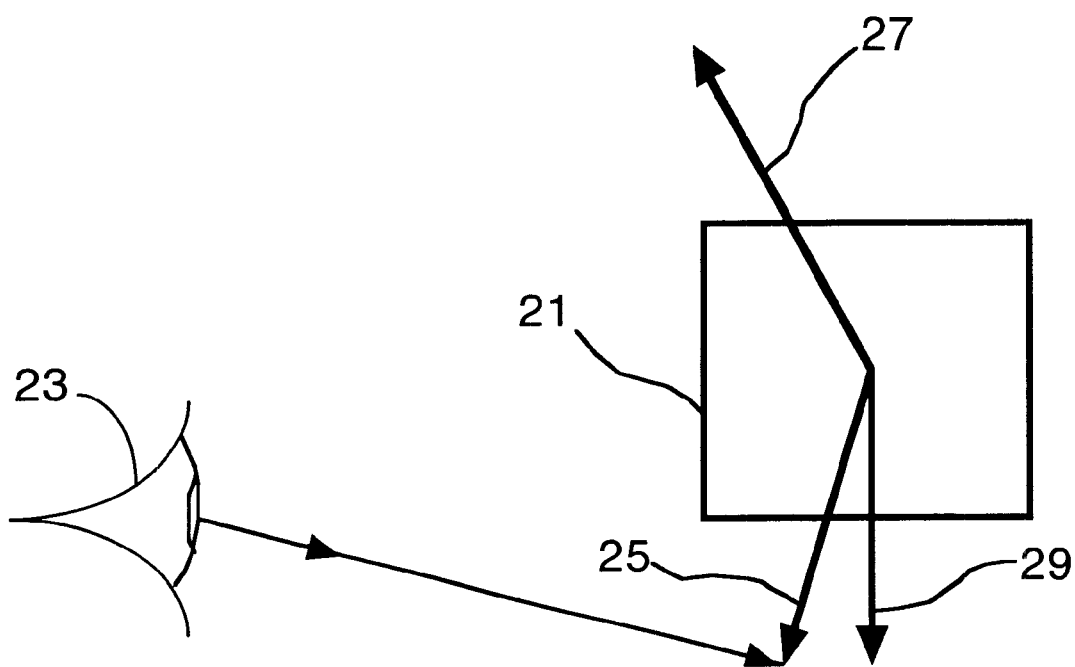
FIG. 2 is a schematic view of a user viewing a 3-D object affected by several different goals (indicated generally by the bold arrows).

FIG. 2 is a generalization of the problem to be solved by the present invention. FIG. 2 depicts a viewer 23 looking at an animated object 21 as it would appear on a video display. In this illustration, the animated object 21(hereafter 'object') is affected by several different and conflicting goals (represented by the directional arrows) including: the desired motion or direction of displacement 25 of the object 21 by the viewer 23, object initiated motion 27, and gravity 29.

How should these goals, some of which are mutually exclusive, be resolved? The simplest solution, which can readily use techniques described in the background art, is to assign the object exclusively to one goal, or to facilitate a goal constrained by another. For example, the user goal may be facilitated exclusively, or constrained by gravity, such that the object is effectively tied to the floor. However, as the number of goals increases, resolution by exclusion or explicit functions provides an unrealistic outcome compared with applying these goals to a tangible object in the real world.

In accordance with the present invention, each goal is expressed in an equivalent format, and then the goals are simultaneously resolved in an unprivileged manner, based on this equivalent information.

Figure 3:
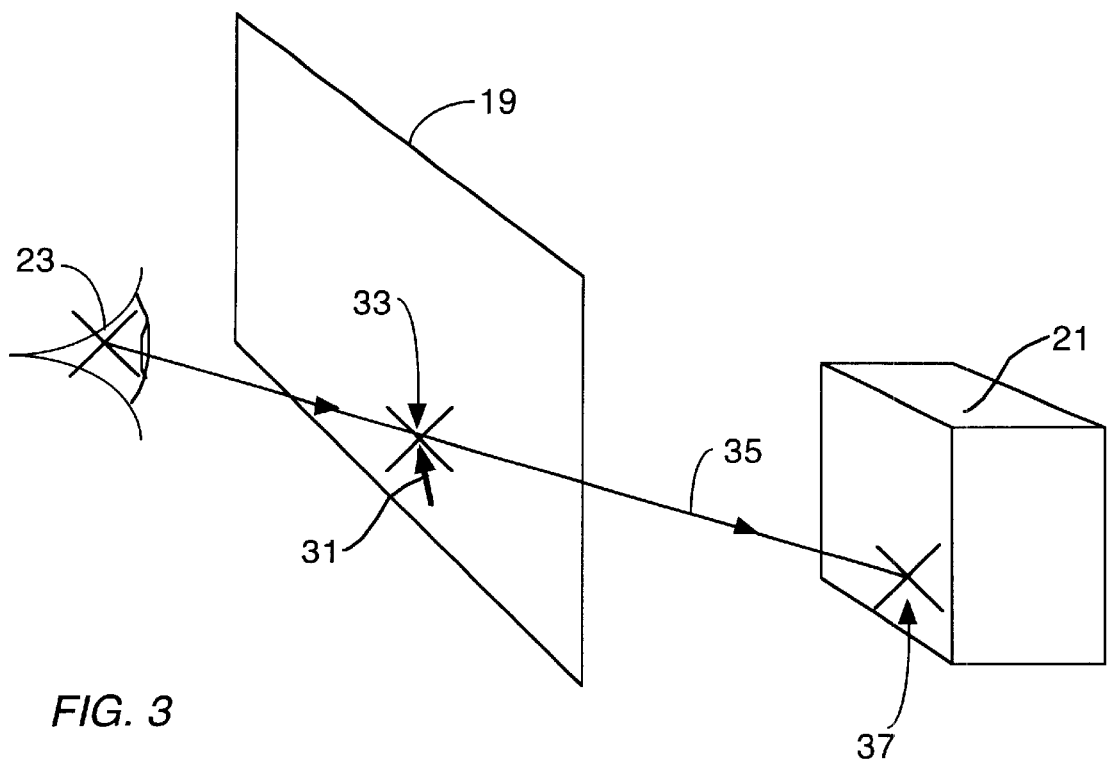
FIG. 3 is a schematic view of a 3-D simulation space portraying the relative positions of the viewer or eye point 23, a cursor point 33 on the 2-D display surface 19 and an ideal point 37 associated with the surface of an animated object residing in the 3-D simulation.

With reference now to FIG. 3, there is depicted a conceptualized framework of the present invention showing the relationship between a 2-D output display 19, an animated 3-D object 21 in a simulation and the user eyepoint 23. As used herein, the term "simulation" or "simulation environment" is defined as the three-dimensional coordinate space within which animated objects exists and which is displayed on a computer display. 2-D input from the user is represented on the 2-D surface of the computer display 19 as a cursor image or user cursor 31 and is capable of independent motion along the length and width axes of the display 19. A cursor point 33 is defined as the point on the 2-D surface of the display 19 on which the user cursor 31 is positioned. A cursor line 35 is defined as the line connecting the eyepoint 23 to the cursor point 33 and which is then extrapolated into the 3-D coordinate space of the simulation to intersect the geometrical data or animated object 21. The point of intersection of the cursor line 35 with the object 21 within the 3-D coordinate space defines the ideal point 37.

Figure 4:
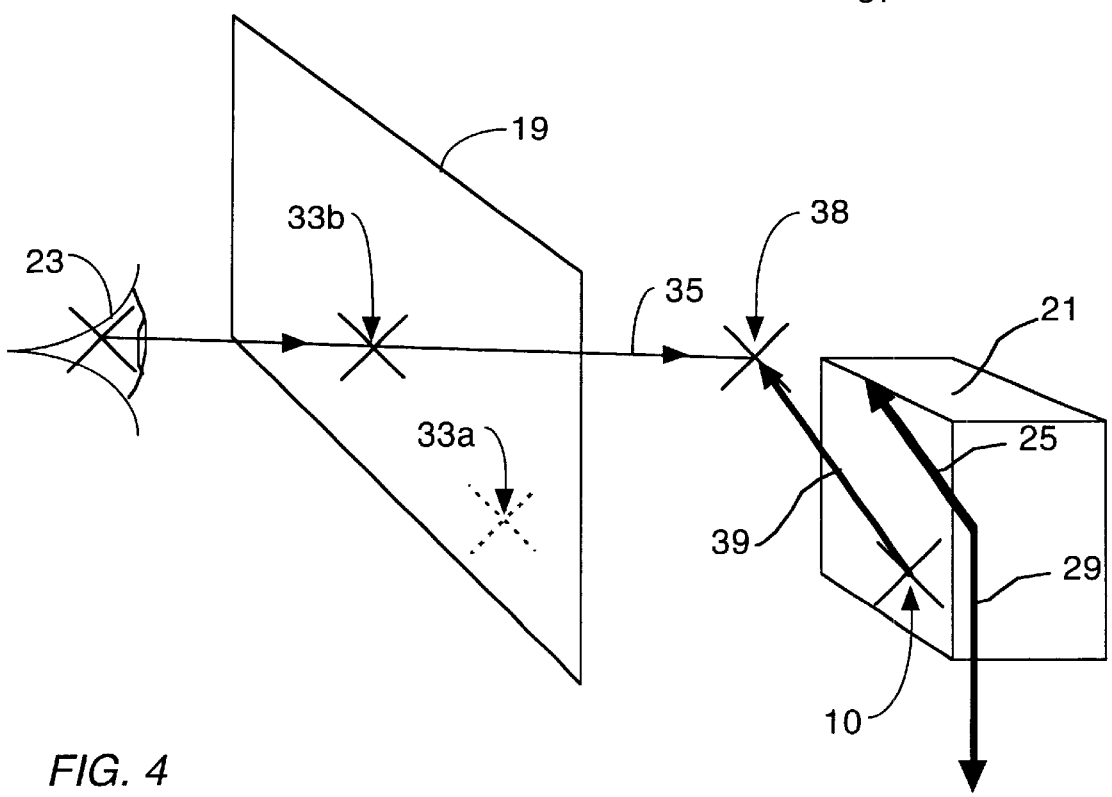
FIG. 4 is a schematic view similar to FIG. 3 and illustrating the change in the location of the cursor point and the ideal point which occurs in response to user applied cursor motion.
Figure 5:
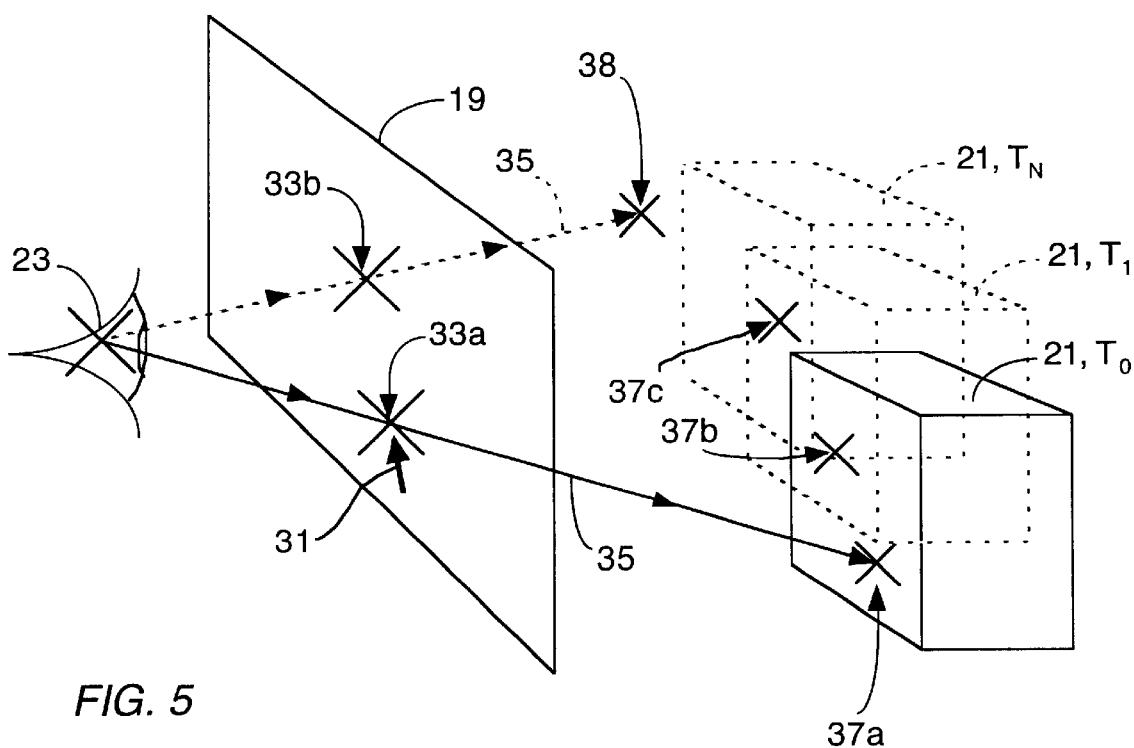
FIG. 5 is a schematic view showing object positions of an object being affected by several conflicting goals in response to user applied cursor motion.

FIGS. 4 and 5 illustrate how the object 21 moves during the object selection process. An object may be selected by single clicking while holding down the mouse button. As best seen in FIG. 4, the cursor is moves from its original location on the display 19 or cursor point 33a to a new cursor point 33b in accordance with input from the viewer 23. In this example, arrow 25 represents a force vector corresponding to the user applied displacement force acting on object 21 and arrow 29 represents the gravity force acting on the object 21. The initial ideal point of the object 21 is indicated at 37a and the desired location of the ideal point is indicated at 38. The arrow linking the initial ideal point 37a to the desired location of the ideal point 38 is the object motion direction vector 39. Since the object 21 is being influenced by plural conflicting goals 25, 29, the user requires continuous feedback information on the magnitude and direction of user applied displacement force that is needed to make the object 21 in the 3-D coordinate space to closely follow the movement of the user cursor on the 2-D display from cursor point 33a to cursor point 33b.

As is best seen with reference to FIG. 5, $T_0$ represents the initial instant in time where no forces are applied to the object 21. The initial coordinate point of the object 21 in the 3-D coordinate space at $T=T_0$ is the same as the initial ideal point 37a. $T_1$ represents the period in time some time after the object 21 has been selected and the user cursor 31 has begun moving and forces (not shown for purposes of clarity in FIG. 5) on the object 21 have been applied. The coordinate point or current ideal point at $T=T_1$ is indicated at 37b. $T_n$ represents the time where the object 21 has been deselected. The coordinate point or current ideal point at $T=T_n$ is indicated at 37c. This figure demonstrates the difference between the desired final location of the ideal point 38 of the object 21 in the 3-D coordinate space and the actual location of the ideal point 37c at the time the object 21 is deselected by the user. The object is deselected by releasing the mouse button that is held down when initially selecting this object synchronously or synchronously.

Simulation Environment

The simulation environment provides a structure within which the objects 21 exist, and can be described via a minimum of three dimensions, and may optionally require additional information. Such information may include the specification of one or more regions containing the 3-D coordinate space, and if plural, the relationships between these regions. However, objects themselves need not be 3-D as long as there is a mapping between them and the space in which they exist.

The contents of the environment are displayed on the screen by way of a view projection, using common computer graphics algorithms for rendering 3-D scenes. The simulation environment has a concept of global time, such that there can be a common special and temporal framework relating the passage of events. Input to the world, simulation changes, and output to the displayed view area may be accomplished synchronously or synchronously.

The software to simulate and render such environments and their contents is well documented in a variety of books and journals. Components of such environments and entire implementations are available in source code form from Internet sites and CD-ROMs detailed in the following publications all of which are incorporated herein by reference: Hecker, Chris, "Physics, the Next Frontier", Game Developer Magazine, Miller Freeman Inc., October/November (1996), December/January (1997), February/March (1997); McCornack, Jamia and Ragnemalm, Ingemar and Celestin, Paul et al., "Tricks of the Mac Game Programming Gurus", Hayden Books, (1995); and Kolb, Jason, "Win32 Game Developer's Guide with DirectX 3", The Waite Group, (1997). An in depth discussion of specific commercial implementations of such environments is found in Abrash, Michael, "Quake: a Post-Mortem and a Glimpse into the Future", Id Software, Computer Game Developers Conference Proceedings, (1997), the subject matter of which is also incorporated herein by reference.

Animated Objects

Each animated object (or simply 'object') 21 in the simulation consist of autonomous individual collections of data associated with a position within the simulated environment. The animated objects may also include a user object representing the user's presence in the simulation, the user object being linked in association with the user cursor. Components of the object data may include a geometric and/or textural image description or a reference to such a description. Objects also include state variables such as position, and spatial occupancy. Object state includes data, and methods or references by some means to methods, used to determine revised object states. These methods may include the determination of how the object should act independently, and how it should react in the presence of components of the environment, and in the presence of the effects of interaction between components. The object state may optionally include any or either of orientation, velocity, mass, and artificial intelligence data.

Interactions between objects 21 include those resulting from a base set of common attributes acquired or inferred from the object and simulation data, including applied force, velocity, momentum, and collision due to spatial occupancy. These interactions are processed by a physical model as will be described more fully below in connection with FIG. 9.

Modeling of object behavior is based on a descriptive and mathematical approach. Objects with an associated geometrical and/or a textural representation, and a state which implies visibility, are rendered to the view area.

Objects may exist at the start of the simulation, and may be created or destroyed at some point during the execution of the simulation. Hence, they may be implemented in one of a number of ways associated with real-time 3-D software and VR environments. Code and descriptive examples of such implementations are included in McCornack, Jamia and Ragnemalm, Ingemar and Celestin, Paul et al., "Tricks of the Mac Game Programming Gurus", Hayden Books, (1995).

Data visible on the 2-D output display 19 is determined by location and state of data within the 3-D database, including the location and orientation of data representing the user, where the viewpoint 23 used as a basis of the view projection is close to the surface of or within the geometrical representation of the user object 21. Hence, this is known as a three dimensional first person perspective view, as the view represents an approximation of the view through the eye or eyes of the user object.

The position of the 2-D user cursor 31 on the display 19, together with the input from one or more buttons, are applied to a variety of purposes. These include altering the orientation of (and hence the view projected from) the user object, moving the position of the user object within the environment, and selecting a specific subset of the data visible on the output device. The point on the surface of the 2-D display 19 associated with the user cursor 31 is defined as the cursor point 33. The line connecting the eyepoint to the cursor point and extending into the coordinate space of the simulation is defined as the cursor line 35.

Cursor Appearance

Under the preferred embodiment of the invention, the graphical representation of the user cursor may be altered as it is moved around the view area, and as viewed data changes. This is used to imply the interaction function should the selection button be pressed. For example, if its is determined that rotation will be performed, the user cursor either with or without association of the user object may include a component that is represented by a hand pointing in the direction of rotation. If forward or backward motion to the user is to be applied, the hand would point in those respective directions.

If an object is to be grasped or clicked, the hand may form either a common appearance, such as a palm, for both, or unique appearances for each of these two actions. This relies on the cursor's relationship to the 3-D data being continually computed, to determine what, if any, object and object state is associated with the cursor point.

Once pressed, the user cursor appearance may also be used to confirm the action currently being taken. If the cursor lies over an object which can be grasped, and the object is grasped, the cursor representation may change into a grasping hand until the object is freed from the user's grasp. Moreover, if an action is being performed, the cursor appearance should remain consistent with that action until the action ceases.

Decisions Required to Apply User Input

Figure 6:
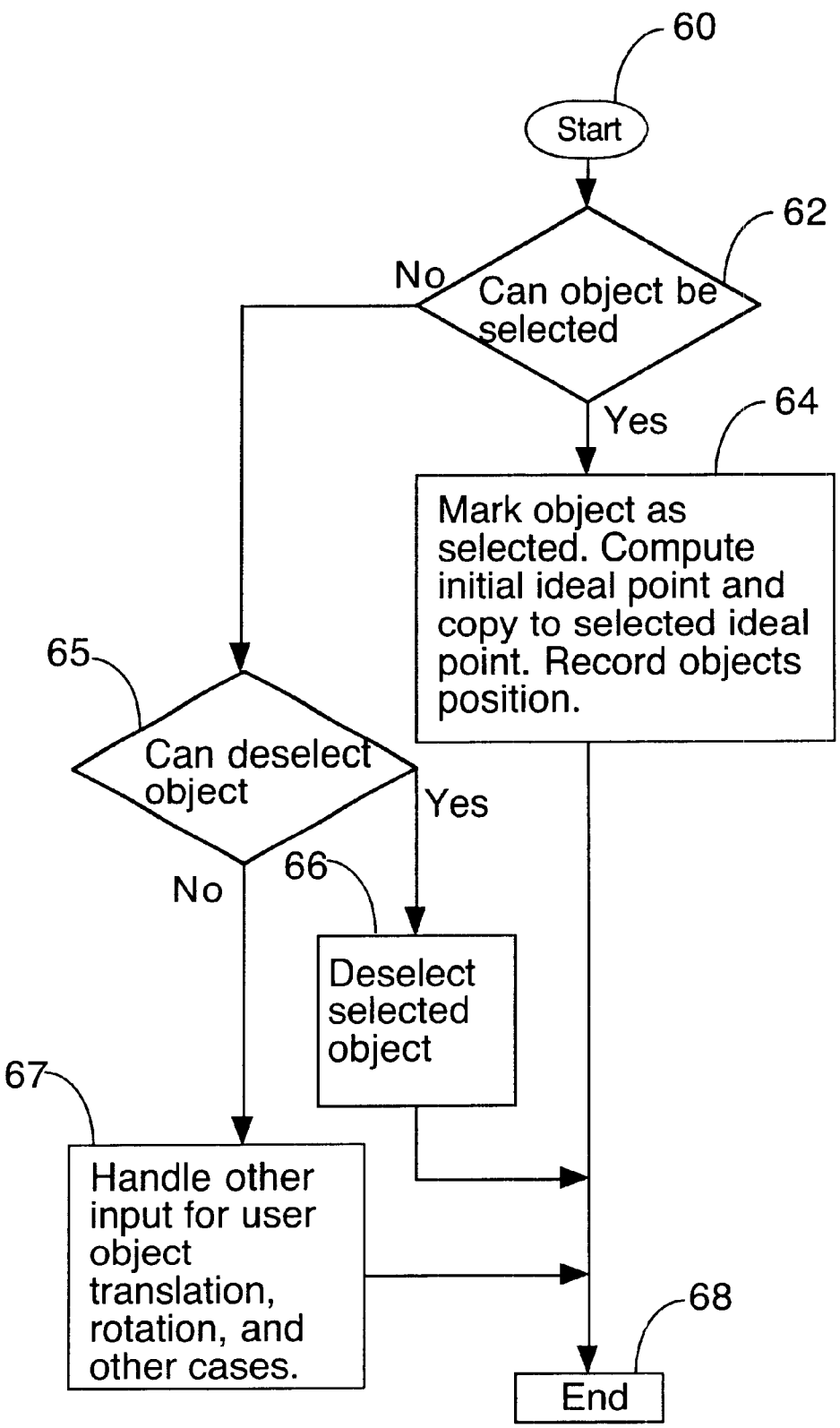
FIG. 6 is a flow chart depicting the process of input interpretation to determine whether an object should be selected, deselected, or if the input should be applied in some other manner.

FIG. 6 is a flow diagram of the object selection process and illustrates how user input is interpreted to determine whether an object should be selected or deselected or if the input should be applied in some other manner.

The decision as to whether to consider user input to be applied directly to user object rotation, translation, or to some relationship between the user object and a secondary object or the state of the secondary object is based on a variety of data. This includes the state of the components of the simulation, current user input status, and possibly other historical information (such as prior user input).

Interaction with a Selected Object

Referring now to FIG. 6, the object selection process begins at step 60. Here the user positions the user cursor adjacent to an object that is to be selected and depresses a mouse button or activates some other form of input. Then at step 62, a determination is made whether the object can be selected. If, at step 64, an object can be and is selected, the initial ideal point at that moment is recorded for reference as the selected ideal point for as long as the object remains selected. The position of the selected object is also recorded at this time. While the object is to selected, the cursor position may be continually moved in 2D. This action, when combined with the state of other input buttons, the 3D position of the data at the time of selection, and the user viewpoint data, is interpreted within the 3D environment as specifying a continually changing 3D coordinate. This is know as the 'ideal point', where for every 2D cursor position there is a single 3D ideal point. Optionally, the ideal point may then be offset from this calculated position and this new position considered the ideal point. For example, it may be moved to the center point of the selected object.

The third dimension must be inferred using the current simulation and other states (e.g. user input states) processed by rules and mathematical functions. One of a number of possible methods for performing this is as follows. The distance from the user may be inferred as being the distance to some component of the object selected or some related component. The full 3D coordinate of the ideal point may then be computed from this data in a number of ways.

As an example, it may be determined that the 3D coordinate lies on a geometric primitive surrounding the user object viewpoint, this primitive being a sphere, cylinder, or some other convex 3D shape. The average radius of the shape is initially the distance from the user object viewpoint position to the selected ideal point. To facilitate additional freedom of motion augmenting that of the 2D cursor, additional button input may be used to alter the parameters of the geometric primitive, such as expanding or contracting the average radius. This would have the effect of moving the ideal point closer to or further away from the user viewpoint.

Under the preferred implementation of the invention, user object state data is applied to form a viewpoint projection. This is applied to the cursor point 33 to calculate the parameters of a cursor line 35 within the simulation world. The cursor line 35 has one end at the eye point 23, and another within the simulation world, referred to as the initial ideal point 37 (see FIG. 3). To calculate the initial ideal point, the intersection or proximity within a threshold of the cursor line and spatial data components of objects or other simulation world components is found. The application of the viewpoint projection to the initial ideal point results in a two dimensional coordinate matching the cursor point. Details of projections and intersection tests may be found in Foley, James and van Dam, Andies, and Feiner, Steven, and Hughes, John, "Computer Graphics: Principles and Practice, Second Edition", Addison Wesley Publishing Company Inc., (1990) and Glassner, Andrew S., "Graphics Gems", Academic Press, (1990), both of which are incorporated by reference herein.

If the initial ideal point represents the intersection with an object whose state implies it is selectable, and some other button input indicating selection is received, the object is considered selected (step 64). If not, the cursor position may still be used to affect the state of the object (step 65). The object may be considered an electronic switch, where a click suffices to alter the object's state. By examining data associated with the object, it may be determined if an object can be physically held, or touched in some other manner (step 67).

Optionally, the object under consideration may not be selected if the ideal point distance from the user viewpoint lies beyond some threshold (step 65). This threshold may be considered to represents the limit of a user's reach. In addition, an optional process dictates that when the cursor appears close to the edge of the projected 3D image, user rotation overrides object selection (step 67). This is to avoid the situation where a user comes close to an object, and then is unable to move as the only option available is selection.

Figure 7:
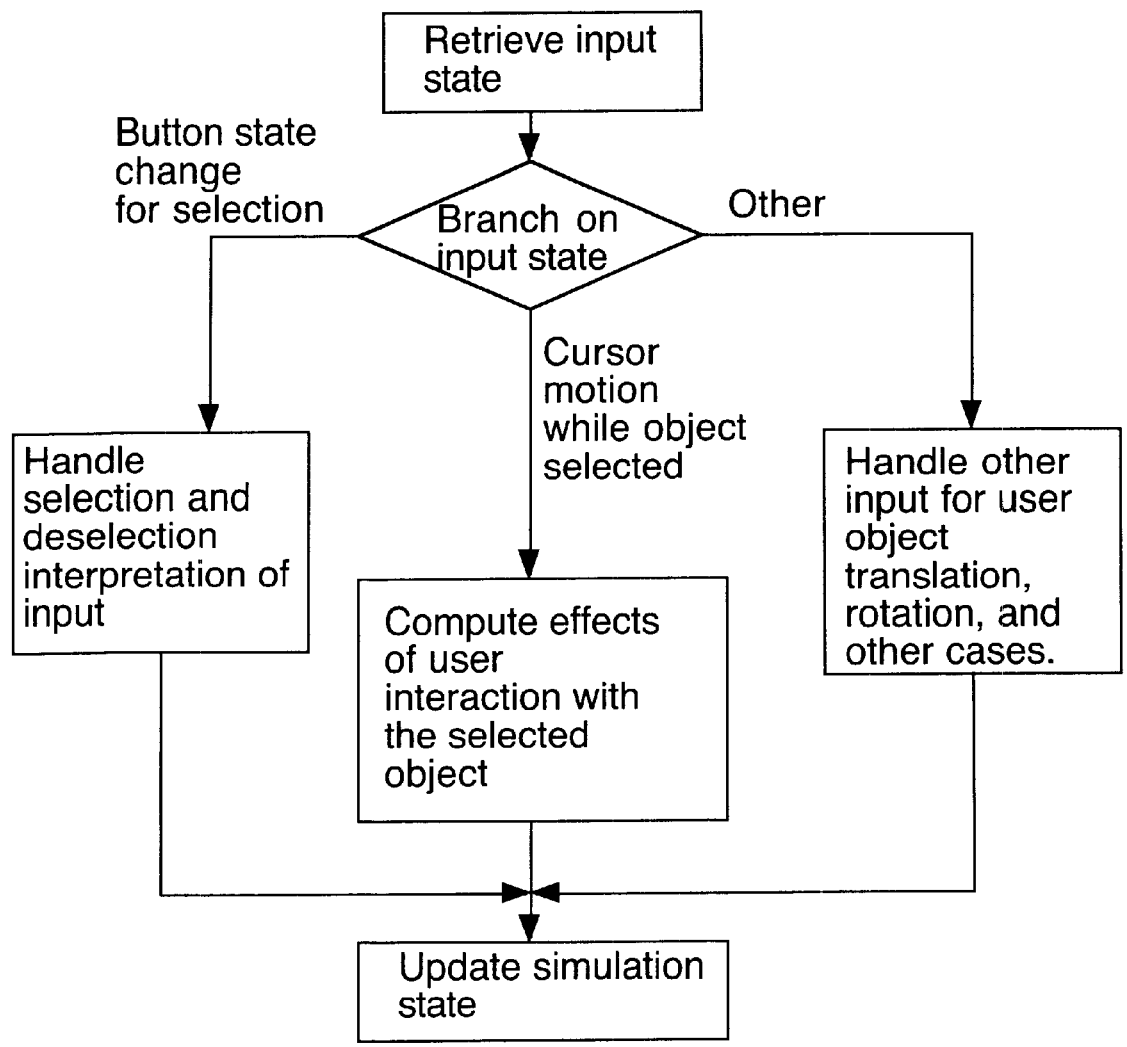
FIG. 7 is a flow chart depicting the process of input interpretation with regard to the selection of an object and the relationship of the selected object to the user object and viewpoint.

It may be that no interaction is possible with any object associated with the cursor position. In this case, cursor data and state of the selection button are applied to determine if and how to reorient the user viewpoint, or to move the user object in a specific direction. This decision process is illustrated in FIG. 7.

Input where No Object is Selected

In accordance with one embodiment of the invention, if an object is not selected, user rotation follows a logic akin to that illustrated in 2-D puzzle solving games and fixed point VR panoramas. If the cursor is located near the edge of the 2-D view area, the user viewpoint data is rotated such that more of the 3-D world obscured beyond that particular edge is made visible. If the cursor lies close to a corner, rotation may occur to reveal data beyond both edges associated with that corner.

If the cursor lies in the middle of 2-D view area at the time of selection, this indicates a desire to move the user object forward, by applying a force within the physical model if the user position can be affected by external agencies. If such effects cannot occur, the position may be altered by directly assigning new values to it. This manner of locomotion is that used by first-person entertainment software, except that with such software a cursor is not visible to indicate direction. Optionally, if a modifier button distinct from the selection button changes state, it is indicated that the user object is desired to be moved backward instead of forward. If the modifier button changes state again, the desired direction of motion will once again return to the forward direction.

The forward direction is obtained from the values determining the orientation of the user viewpoint. If a backward direction is required, the forward direction data is used. If an angle is required, one component of the user facing direction, preferably the yaw, is rotated by 180 degrees. If the direction is expressed as a vector, the direction is reversed by reversing the signs of the individual axis components of the vector.

An optional addition to this process involves rotation and translation being carried out simultaneously. This can occur in a frame within the 2D view area. Beyond the edges of the frame farthest from the view center, only rotation is applied. Beyond the edges of the frame nearest to the view center, only translation is affected. Within the frame itself, both may be applied.

An optional further embodiment of the invention may include a function for use in determining the magnitude of a state change. This may be applied independently or coupled to either or both of the orientation or positional states. Under the preferred embodiment of the invention, such a function is applied to the magnitude of rotation, such that the farther away the location of the cursor position from the view area center, the greater the rate of rotation.

While the selection button is pressed, and initially an object was not selected, the type, direction, and optionally the magnitude of state change may be continually revised as a result of changing cursor position. For example, if the cursor is moved from the view area center to its leftmost edge, the operation performed may alter from forward (or backward) motion to a left turn. However, if an object was not initially selected, it may not be selected until the selection button has been released.

Object Locomotion via Selection

Figure 8A:
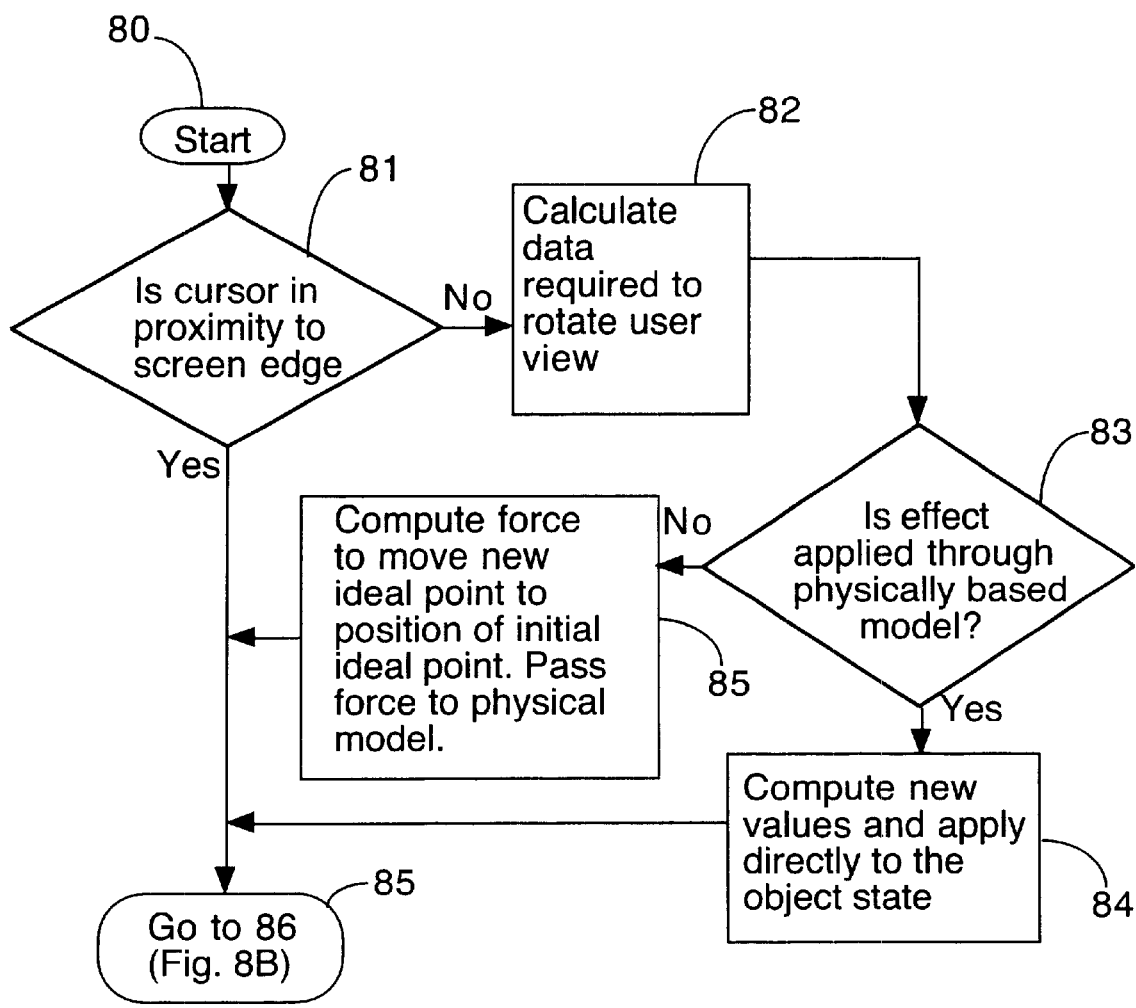
FIGS. 8A–8B illustrate a flow chart depicting the interpretation of input while an object is selected by the user.
Figure 8B:
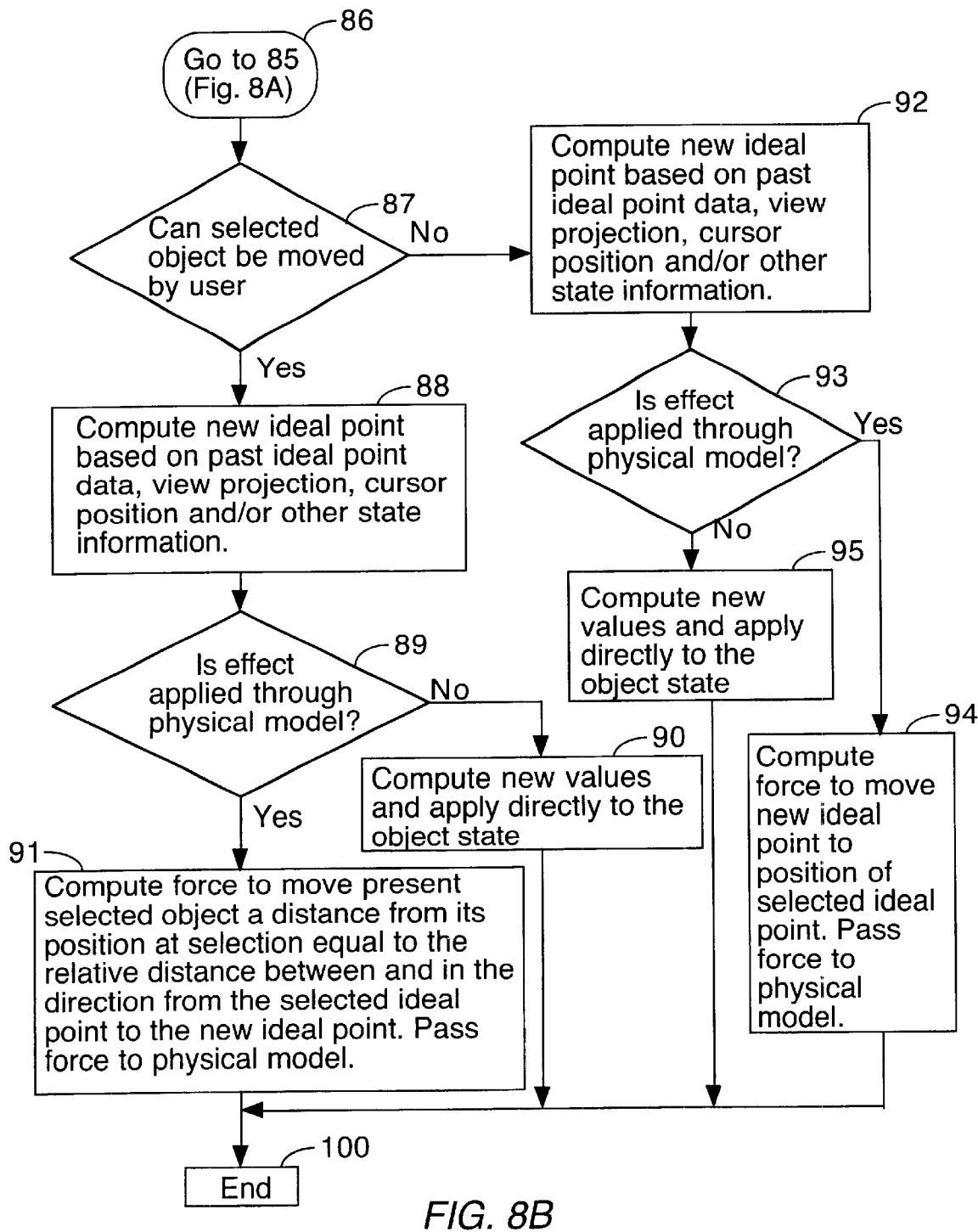

With reference now to FIGS. 8A–8B, the process for interpreting input while an object is selected for moving the object will now be described. The process begins at step 80. At step 81, the location of the cursor is determined. If the cursor is in proximity to the screen edge, then the data required to rotate the user view is calculated at step 82. At step 83 it is then determined whether the effect is applied though the physically based model. If yes, then new values are computed and applied directly to the object state at step 84. If no, then the force needed to move the new ideal point to position of the initial ideal point is computed at step 85 and the force is passed to the physically based model.

With reference now to FIG. 8, two cases then occur, that is, either (1) the selected object is mobile, or (2) the selected object is not mobile. To determine which case to execute, at step 87 determination is made as to whether the selected object can be moved by the user. This determination can be based upon a variety of data. Under the preferred implementation, two criteria are used. If it is explicitly stated that the selected object is immobile (by the use of flags within the object, or the type of the object itself), then it is considered immovable by the user. Alternatively, if an attribute representing the mass of the object exceeds some threshold, for example the mass of the user object, the selected object is again considered immobile. Only one of these decisions need yield a conclusion of immobility for the selected object to be considered immobile.

In the first case, the selected object is considered to be mobile. The data representing the selected object is to be translated and/or rotated, with the goal that the current ideal point as determined from the cursor position, input button states, and object position, is eventually moved to coincide with the selected ideal point. This occurs at step 88. A determination is then made at step 89 whether the effect is to be applied through the physical model. A force is applied if the position of the selected object can be affected by some other component of the environment, otherwise, at step 90, direct displacement is applied. If, at step 89, a force is to be applied, the direction and magnitude of the force is calculated at step 91 to eventually move the object from its position at the time of selection by a calculated displacement and the selection process ends at step 100. This displacement is equal to the difference between the selected ideal point and the current ideal point, in the direction from the selected ideal point toward the current ideal point. Note that due to this model, a novel action is possible with a selected object in the implementation conditions detailed for my invention. Given that the object has momentum, is light enough, and if it is dragged rapidly and released during this action, the object may be thrown into the environment.

Optionally, the orientation of (and hence the projected view from) the user object may be altered as the cursor reaches the edge of the 2D displayed view. Simultaneously, other environmental factors are continually applied to the object (for example gravity, obstruction by other data in the 3D space, or ownership/attraction to another 3D entity) such that the effect of user interaction may be reduced or negated. This simulates the user endeavoring to move a selected object through 3D space in the presence of forces and entities which are independently altering the state of the selected object. Other forces may be being applied to the user while selection interaction is occurring, causing the ideal point to move. For instance, the user may be pushed, picked up, or be falling.

Novel Manner of User Object Locomotion

If in the above selection decision the selected object is considered immobile (step 87), the second case arises. At step 92 a new ideal point is computed based on previous sets of data, including past ideal point data, view projection, cursor position and/or other state information. A determination is then made (at step 93) whether the effect is applied though the physical model. Here, the data representing the user, contained within the user object, may be translated and/or rotated, with the goal that the current ideal point as determined from the cursor position, input button states, and object position, is eventually moved to coincide with the selected ideal point.

Rather than moving the selected object, this is achieved by displacing the user's position through the application of force (computed at step 94) or by applying the new values directly to the user object state (step 95), and/or altering the orientation either through the application of force (computed at step 94) or by applying the new values directly to the user object state (step 95). This depends on whether rotation is a component of the physical model. This displacement is equal to the difference between the selected ideal point and the current ideal point, in the direction from the current ideal point toward the selected ideal point. As above, all this occurs while other environmental factors are independently applied which may reduce or negate the effect of user interaction. The force may optionally be constrained by the state of the user object, for example being limited by the maximum strength or energy content of the user object. The result simulates the user reaching out and holding an item in order to move him or herself, for example by climbing, while influenced by the presence of other entities and forces such as gravity.

During the above two cases the ideal point may be altered as a result of input changes allowing the user to alter the goal at any time during a selection interaction.

Force Results and Calculations

Note that a force is applied which may eventually move the object in question. If the user object has finite strength, the force applied may rapidly move a low mass object, while a heavy object moves in a sluggish manner, or not at all. All forces are provided to the physical based model for application. The force may optionally be constrained by the state of the user object, for example being limited by the maximum strength or energy content of the user object.

Force may optionally be varied according to the magnitude of the displacement and optionally varied with respect to magnitude and direction. In the preferred implementation, if the displacement is small, the force is reduced to some degree. Force is maintained at a large enough value to hold the current ideal point around the selected ideal point if only constant force such as gravity are present. This allows objects to settle close to a required unvarying displacement without violently oscillating around it. It allows the user to pull more strongly on a distant object, or an object being affected pulled away by another simulation entity. It also allows easier control of fine object adjustments than would exist if a uniform force were used. The force may optionally be capped to a maximum, representing the maximum strength of the user.

Real-time Simulation

In accordance with the preferred embodiment of the invention, the states of objects within the simulation, and possibly other data, are updated whether or not user input is occurring. As a result of object motion, and/or their own internal states, forces and state changes may be applied to simulation objects independent of user input. The results of these and other state changes are then used to alter the state of the output device, providing feedback as to the user's actions and other actions in the simulation visible to the user. The updates of states occur with sufficient frequency such that the user is provided with the illusion of continuous motion.

Physical Model

The invention involves the treatment of forces resulting from user actions in the same manner as any other force present within the simulation. This is done by passing forces to a physical model for processing. Such models are commonly used in VR and real-time 3D entertainment applications, usually to simulate the locomotion and collisions of objects, and are documented in a variety of books and journals. The only unusual use of such a model within the current invention is to process the locomotion and collision of certain objects resulting from the actions following their selection by a 2D cursor. However, as such interactions are expressed in the same terms as any other application of force, no new physical model code is required to deal with them.

Figure 9:
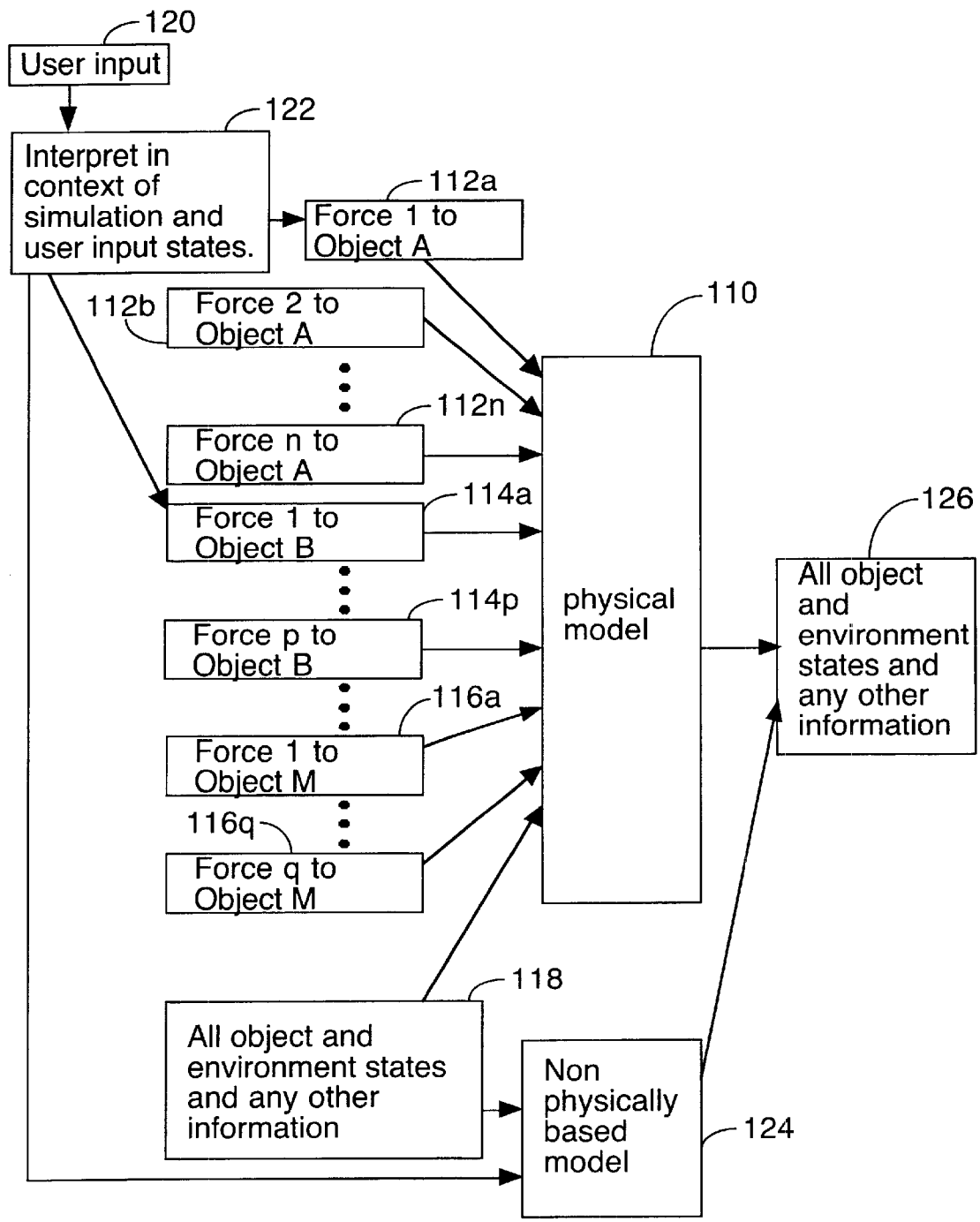
FIG. 9 is a flow chart depicting the process of force processing by the physical model.

With reference to FIG. 9, the physical model 110 processes the effects of all forces exerted on all objects and any other physical behavior to adjust the states (positional and optionally other information) of the objects affected by these forces, as well as other effects within the mandate of the model (for example, the effect of velocity on position, and the effect of collision on velocity). In the example shown in FIG. 9, the physical model is processing forces 1 to n exerted on object A (denoted by reference numerals 112a–112n), forces 1 to p exerted on object B (denoted by reference numerals 114a–112p), forces 1 to q exerted on object M (denoted by reference numerals 116a–116q), and is also processing all object and environment state changes 118. Newtonian physics concepts are used to compute the results of forces, collisions, and other physical interactions upon data within the simulation.

If the simulation is conducted in discrete time steps, it is preferable that forces due to be applied, including those expressing the effects of user input 120, 122, must be submitted before the model can calculate the results of that step. However, forces may also be processed in a continuous manner, as well in other discrete models.

Descriptions and components of physical models may be found in, for example, Hecker, Chris, "Physics, the Next Frontier", Game Developer Magazine, Miller Freeman Inc., October/November (1996), McCornack, Jamia and Ragnemalm, Ingemar and Celestin, Paul et al., "Tricks of the Mac Game Programming Gurus", Hayden Books, (1996), and Foley, James and van Dam, Andies, and Feiner, Steven, and Hughes, John, "Computer Graphics: Principles and Practice, Second Edition", Addison Wesley Publishing Company Inc., (1990), all of which are hereby incorporated by reference.

Non-physical Modeling

Note that specific state changes in objects, such as translation, are possible without use of the physical model. Teleportation is an action usually involving the translation of an object from one point to another with no intermediary position, something extremely difficult to model using the physical model. If the object represents the only ghost inside some virtual physical world, it would have no physical presence, being able to pass through other objects or have them pass through it. The ghost may still be moved by forces, but other physically forces, applied externally, would have no effect on the ghosts' own state.

The purpose of the physical model is to combine the effects originating from multiple sources upon specified objects in a consistent manner. In the case of teleportation, the physical model can have no affect on specific object states, such as position, between the time the object vanishes from the world, and the time it reappears. Regarding the ghost, as physical effects from other data in the environment have no impact on the ghost objects' positional state, there is no requirement for the resolution of complex and conflicting effects upon the positional state.

The only limitation of this invention with regard to the physical model is then that, in general, all effects resulting in change of a specific state of an object must pass through the physical model. This, excepting those changes in the specific state of the object where between and exclusive of the start and end of the changes in the specific state, there will be no other effect applied to the object which is within the ambit of said physical model and potentially affects the specific state of the object. This may be determined by examining the states of the object involved. For example, specific flags could be set in the state, explicitly stating that a certain type of external effect could or could not occur.

Non-physically Based User Interaction

Optionally, certain changes to the user object resulting from user input may bypass the physical model if not under the mandate of the model. For example, if torque, or any other kind of force involving rotation, is not modeled in a physical manner, user rotational input may interpreted in some other manner outside of the scope of my method.

Optionally, in the same manner, user input may bypass the physical model directly to a non physically based model 124 if the effect is not of a physical nature under the definition of the model. For example, the user may alter the state of another object by clicking on it, rather than grabbing hold of it. The decision as whether to consider user input physical or not is based on the state of the components of the simulation, current user input status, and possibly other historical information (such as prior user input). One instance of a simulation state which might act as the basis of the interpretation is a flag associated with an object dictating whether it can be touched physically or not. An instance of an historic basis for a decision might be the duration between the pressing and releasing of a button while the cursor lies spatially close to a viewed object. If the duration is short, the action may be considered non physical as, for example, the effect of an instantaneous click. If the duration is any longer, the action may be considered physical as, for example, where an object is being grasped and dragged. The processing results from the physical model 110 and non physically based model 124 are passed on as state change information in the object and environment 126.

Accordingly, the reader will see that the manipulation of data using input including that of a 2D cursor can be used to provide novel and easy to use facilities to enhance interaction in a first person environment simulated by a computer equipped with low cost 2D input and output peripherals. Performance of the actions described below can be carried out using operations similar in nature to those performed using human hands. This implies that my interaction method for these tasks is easier to learn than comparable existing implementations in this environment.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. A method for interactive manipulation of an animated object displayed in a repeatedly updated three-dimensional simulation on a computer controlled display system having a computer and a two-dimensional display coupled to the computer, comprising the steps of:

a) providing a user actuated input controller signal for selectively positioning a two dimensional cursor point on the two-dimensional display;

b) providing on the display a user cursor corresponding to the position of the cursor point and at least one animated object, each animated object having associated therewith:

i) geometrical data indicating location of the animated object within the display;

ii) a physical model representing a free body diagram of the animated object;

iii) a pre-defined set of instructions representing both user-applied and other forces exerted on the physical model of the animated object;

c) positioning the user cursor adjacent to the animated object and signalling the computer to activate a force application mode;

d) applying a user-applied displacement force to the physical model for the animated object in response to force application mode signals from the computer, the user-applied displacement force being applied in a direction consistent with a goal of maintaining the animated object in close proximity to the user cursor in the coordinate space of the display;

e) simultaneously resolving the user-applied displacement force with the other forces independent of user input exerted on the animated object within the physical model, the resolution of forces providing a state change in at least one of the animated object or a user viewpoint projection of the animated object within the simulation; and f) re-displaying the simulation in accordance with the state change occurring in step e).

2. The method of claim 1, wherein the step of applying a displacement force to the physical model of the animated object includes the steps of:

a) processing geometrical data within the simulation using the user viewpoint projection to create a succession of two-dimensional images on the display;

b) calculating the parameters of a cursor line within the simulation as a function of the cursor point, the user viewpoint projection and an eyepoint, wherein the eyepoint represents the position of the user's eye within the simulation;

c) calculating an initial ideal point as the approximate intersection of the cursor line with geometrical data within the simulation;

d) selecting via user input the calculated ideal point where the associated geometrical data defines a component of the animated object;

e) maintaining a collection of selected object data;

f) calculating a current ideal point using the initial ideal point and the cursor point in response to cursor motion;

g) calculating a coordinate point representing the current state of the animated object;

h) calculating the difference between the current ideal point and the calculated coordinate representing the current state of the animated object, the calculated difference defining an object motion direction vector corresponding to the applied displacement force; and i) calculating the applied displacement force acting upon the animated object as a function of the object motion direction vector.

3. The method of claim 2, which further includes one animated object as a user object representing the user's presence in the simulation, the user object being linked in association with the user cursor.

4. The method of claim 3, wherein the step of positioning the user cursor and signalling the computer to activate a force application mode includes the step of causing the user object to select an animated object in the display.

5. The method of claim 4, wherein the animated object selected by the user object is immovable and the step of re-displaying the state change creates the impression that the user object is moving through the simulation by self-locomotion.

6. The method of claim 5, wherein the user object includes a component in the form of a hand and the step of selecting includes forming the hand to grasp the selected animated object.

7. The method of claim 1, wherein the input controller signal is from a mouse.

8. The method of claim 7, wherein the step of positioning the user cursor and signaling the computer to activate a force application mode includes the step of activating a switch.

9. The method of claim 8, wherein the step of activating a switch comprises pressing a button on the mouse.

10. The method of claim 2, wherein a plurality of animated objects are displayed on the display and wherein at least one of the plurality of animated objects represents the presence of a second user in the simulation.

11. The method of claim 2, wherein the step of applying a displacement force includes the step of varying applied force in accordance with magnitude of displacement of the user cursor from the apparent position of the animated object displayed on the display.

12. An apparatus for interactive manipulation of animated objects displayed in a repeatedly updated three-dimensional simulation on a computer controlled display system having a computer and a two-dimensional display coupled to the computer, comprising:

a) means for selectively positioning a two dimensional cursor point on a two-dimensional display;

b) means for displaying a user cursor corresponding to the position of the cursor point and at least one animated object, the at least one animated object having associated therewith:

i) geometrical data indicating location of the animated object within the display;

ii) a physical model representing a free body diagram of the animated object;

iii) a pre-defined set of instructions representing both user-applied and other forces exerted on the physical model of the animated object;

c) means for positioning the user cursor adjacent to the animated object and signalling the computer to activate a force application mode;

d) means for applying a user-applied displacement force to the physical model for the animated object in response to force application mode signals from the computer, the user-applied displacement force being applied in a direction consistent with a goal of maintaining the animated object in close proximity to the user cursor in the coordinate space of the display;

e) means for simultaneously resolving the user-applied displacement force with the other forces independent of user input exerted on the animated object within the physical model, the resolution of forces providing a state change in at least one of the animated object or a user viewpoint projection of the animated object within the simulation; and f) means for re-displaying the simulation in accordance with the state change occurring in step f).

13. The apparatus of claim 12, wherein the means for applying a displacement force to the physical model of the animated object further includes:

a) means for processing geometrical data within the simulation using the user viewpoint projection to create a succession of two-dimensional images on the display;

b) means for calculating the parameters of a cursor line within the simulation as a function of the cursor point, the user viewpoint projection and an eyepoint, wherein the eyepoint represents the position of the user's eye within the simulation;

c) means for calculating an initial ideal point as the approximate intersection of the cursor line with geometrical data within the simulation;

d) means for selecting via user input the calculated ideal point where the associated geometrical data defines a component of the animated object;

e) means for maintaining a collection of selected object data;

f) means for calculating a current ideal point using the initial ideal point and the cursor point in response to cursor motion;

g) means for calculating a coordinate point representing the current state of the animated object;

h) means for calculating the difference between the current ideal point and the calculated coordinate representing the current state of the animated object, the calculated difference defining an object motion direction vector corresponding to the applied displacement force; and i) means for calculating the applied displacement force acting upon the animated object as a function of the object motion direction vector.

14. The apparatus of claim 13, wherein the at least one animated object further includes a user object representing the user's presence in the simulation, the user object being linked in association with the user cursor.

15. The apparatus of claim 13, wherein the means for positioning the user cursor and signalling the computer to activate a force application mode includes means for causing the user object to select an animated object in the display.

16. The apparatus of claim 15, wherein the animated object selected by the user object is immovable such that re-display of the state change creates the impression that the user object is moving through the simulation by self-locomotion.

17. The apparatus of claim 16, wherein the user object includes a component in the form of a hand and the means for selecting includes means for forming the hand to grasp the selected animated object.

18. The apparatus of claim 12, wherein the input controller signal is from a mouse.

19. The apparatus of claim 18, wherein the means for positioning the user cursor and signaling the computer to activate a force application mode includes means for activating a switch.

20. The apparatus of claim 19, wherein the means for activating a switch comprises a depressible button on the mouse.

21. The apparatus of claim 13, wherein a plurality of animated objects are displayed on the display and wherein at least one of the plurality of animated objects represents the presence of a second user in the simulation.

22. The apparatus of claim 13, wherein the means for applying a displacement force includes means for varying applied force in accordance with magnitude of displacement of the user cursor from the apparent position of the animated object displayed on the display.

23. A computer program product for interactively manipulating animated objects displayed in a repeatedly updated three-dimensional simulation on a computer controlled display system having a computer and a two-dimensional display coupled to the computer, comprising:

a) a computer-readable medium;

b) first program instruction means for instructing a processor to selectively position a two dimensional cursor point on a two-dimensional display;

c) second program instruction means for instructing a processor to display a user cursor corresponding to the position of the cursor point and at least one animated object, the at least one animated object having associated therewith:

i) geometrical data indicating location of the animated object within the display;

ii) a physical model representing a free body diagram of the animated object;

iii) a pre-defined set of instructions representing both user-applied and other forces exerted on the physical model of the animated object;

d) third program instruction means for instructing a processor to position the user cursor adjacent to the animated object and to signal the computer to activate a force application mode;

e) fourth program instruction means for instructing a processor to apply a user-applied displacement force to the physical model for the animated object in response to force application mode signals from the computer, the user-applied displacement force being applied in a direction consistent with a goal of maintaining the animated object in close proximity to the user cursor in the coordinate space of the display;

f) fifth program instruction means for instructing a processor to simultaneously resolve the user-applied displacement force with the other forces independent of user input exerted on the animated object within the physical model, the resolution of forces providing a state change in at least one of the animated object or a user viewpoint projection of the animated object within the simulation;

g) sixth program instruction means for instructing a processor to re-display the simulation in accordance with state changes occurring in the animated object and user view point projection; and h) wherein each of said program instruction means is recorded on said medium.

* * * * *